(12) United States Patent
Coles et al.

(10) Patent No.: US 7,685,683 B2
(45) Date of Patent: Mar. 30, 2010

(54) CLAMP

(75) Inventors: David Howard Coles, Frome (GB); Danny Ward, Chilcompton (GB)

(73) Assignee: HCL Fasteners Ltd, Radstock (GB)

( * ) Notice: Subject to any disclaimer, the term of this patent is extended or adjusted under 35 U.S.C. 154(b) by 382 days.

(21) Appl. No.: 11/483,828

(22) Filed: Jul. 10, 2006

(65) Prior Publication Data

US 2007/0017067 A1    Jan. 25, 2007

(30) Foreign Application Priority Data

Jul. 11, 2005   (EP)   ................................ 05254367

(51) Int. Cl.
*F16L 33/035*   (2006.01)
*B65D 63/10*   (2006.01)

(52) U.S. Cl. .................. 24/16 PB; 24/20 TT; 248/74.3; 285/252; 285/254

(58) Field of Classification Search ............... 24/16 PB, 24/16 R, 17 A, 17 AP, 20 TT; 248/68.1, 74.1, 248/74.3, 229.1, 229.17; 285/252, 254
See application file for complete search history.

(56) References Cited

U.S. PATENT DOCUMENTS

| | | | | |
|---|---|---|---|---|
| 3,515,363 A | * | 6/1970 | Fisher | .......................... 24/339 |
| 3,605,200 A | | 9/1971 | Vallinotto et al. | ......... 24/20 TT |
| 3,925,851 A | | 12/1975 | Bevans | ...................... 24/20 TT |
| 4,061,299 A | * | 12/1977 | Kurosaki | ...................... 248/73 |
| 4,214,351 A | * | 7/1980 | Wenk | ....................... 24/16 PB |
| 4,564,163 A | * | 1/1986 | Barnett | ..................... 24/16 PB |
| 4,935,992 A | | 6/1990 | Due | ............................ 24/16 R |
| 4,958,791 A | * | 9/1990 | Nakamura | ................ 24/16 PB |
| 6,212,742 B1 | * | 4/2001 | Baskin | ......................... 24/457 |
| 7,055,784 B2 | * | 6/2006 | Stigler | ...................... 24/16 PB |

FOREIGN PATENT DOCUMENTS

EP   1 138 533 A2   10/2001
FR   2 858 918 A1   2/2005

* cited by examiner

*Primary Examiner*—Robert J Sandy
(74) *Attorney, Agent, or Firm*—Husch Blackwell Sanders Welsh & Katz

(57) ABSTRACT

A clamp comprising a band (10) having, at one end, a pair of axially spaced jaws (16, 18) comprising an upper jaw (16) and a lower jaw (18) and, at the other end, a tongue (28) that can be inserted between the jaws. The tongue has an upper surface and a lower surface and the top jaw (16) has a lower surface that includes a single engagement tooth (20). The upper surface of the tongue includes an engagement tooth (29) having a cavity (30) behind it that can accommodate the engagement tooth (20) of the upper jaw to hold the clamp in a closed position. The lower surface (48) of the tongue is provided with a recess (40) that accommodates the lower jaw (18) when the clamp is in the said closed position.

11 Claims, 2 Drawing Sheets

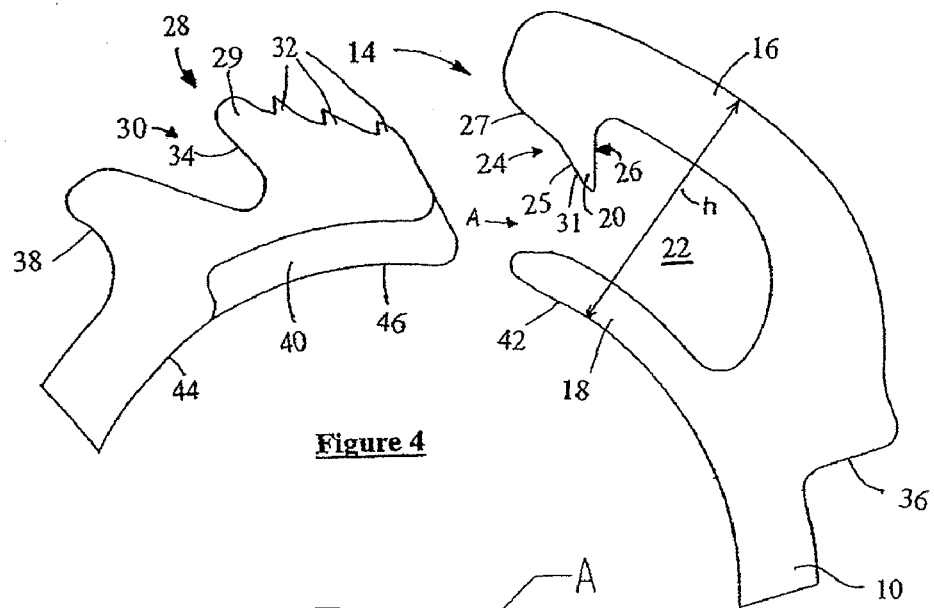
Figure 4
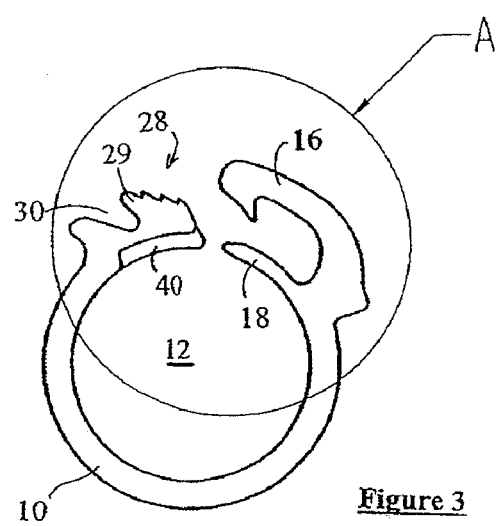
Figure 3
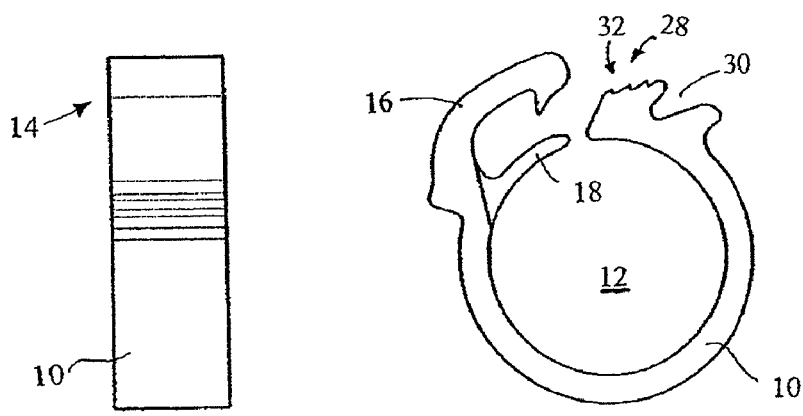
Figure 6        Figure 5

CLAMP

TECHNICAL FIELD

The present invention relates to clamps for encircling and clamping articles, e.g. a hollow cylindrical article, such as a hose. It can be used as a hose clamp for encircling a hose and holding it onto a spigot.

BACKGROUND ART

U.S. Pat. No. 3,605,200 describes a hose clamp that includes a band for encircling an article such as a hosepipe. One end of the band includes a pair of jaws with internal teeth on the upper jaw; the other end of the band includes a serrated tongue with teeth on its upper surface that can be inserted, tip first, into the space between the jaws so that several teeth on the top jaw engage with corresponding teeth on the serrated tongue and hold the band in a closed position. The lower jaw lies adjacent to the hose. An extension is provided on the same end of the band as the tongue and overlies the top jaw when the two ends of the band are joined and keeps the top jaw from riding up and disengaging from the teeth of the tongue. When joined, the two ends of the clamp (known as the "head") has a thickness made up of the thickness of each of the two jaws together with the thickness of the extension and the thickness of the tongue and hence is relatively tall. Such a clamp cannot be used in a restricted space, i.e. a space that is not large enough to accommodate the head or even in a space that does not to allow sufficient access to the head to tighten the clamp.

A hose clamp is known under the trade mark "SNAPPER" that is configured as in U.S. Pat. No. 3,605,200 but it provides a recess in the bottom of the tongue that accommodates the lower jaw when the clamp is fastened.

EP 1 138 533 describes a bracket for holding a refrigerant pressure container for a vehicle air conditioning system and includes a strap for encircling the container, a tongue on one end of the strap and a pair of jaws on the other end. The lower surface of the tongue and the inner surface of the lower jaw both have a set of teeth that inter-engage to hold the strap in a closed loop around the container and clamp the bracket on the container. The inter-engagement of different numbers of teeth provide different clamping forces on the container. Locking elements are provided on the upper jaw and the tongue that, when the teeth have been engaged to a certain extent, engage with each other and prevent the bracket being opened; however, the locking elements do not themselves engage to hold the tongue within the jaws against the tension in the strap.

DISCLOSURE OF THE INVENTION

In many applications, particularly in the field of original equipment manufacture, a clamp is used repeatedly for the same component. The present invention is partly based on an appreciation that, in such circumstances, it is not necessary to provide the multiplicity of teeth of the above-described prior art clamps and the present invention provides a clamp having a single engagement tooth on the upper jaw that engages behind a single engagement tooth on a tongue, providing a single closing position. This has the advantage that the person who applies the clamp knows that the clamp is fastened to the correct degree, in contrast to the prior art arrangement in which there are many possible closing positions, depending on the number of teeth that are engaged.

However because only a single pair of engagement teeth are provided to maintain the clamp closed, the teeth must have a greater depth than those of the prior art clamp, which uses the engagement of multiple teeth to maintain the clamp in the closed position. Unfortunately this adds to the thickness of the head. The present invention overcomes this disadvantage in at least one way. Firstly, the tongue is provided with a recess to accommodate the lower jaw. Secondly the extension that lies outside the top jaw in the arrangement of U.S. Pat. No. 3,605,200 can be dispensed with since its function to prevent the teeth becoming disengaged when the tension is applied to the band is not required; this is because the increased depth of the single engagement tooth on each of the top jaw and the tongue (as compared to the depth of the teeth in a clamp with multiple engagement teeth) means that it is harder for the teeth to become disengaged, especially if the teeth are barbed, i.e. have a backwardly sloping rear surfaces. Thus, according to the present invention, it is possible to make a clamp having a head whose height is made up only by the thickness of the tongue and the thickness of one jaw.

According to the present invention, there is provided a clamp comprising:
  a band having, at one end, a pair of axially spaced jaws comprising an upper jaw and a lower jaw and, at the other end, a tongue that can be inserted between the jaws and that has an upper surface and a lower surface,
  wherein the top jaw has a lower surface that includes one engagement tooth that is substantially taller than any other tooth on the said lower surface of the top jaw;
  wherein the upper surface of the tongue includes an engagement tooth having a cavity behind it that can accommodate the said engagement tooth of the jaw whereby the said engagement teeth can be brought into engagement with each other by inserting the tongue between the jaws to hold the clamp in a closed position and
  wherein the lower surface of the tongue is provided with a recess that accommodates the lower jaw when the clamp is in the said closed position By the term "engagement" tooth, we mean a tooth that engages with another tooth when the clamp is fully fastened in the closed position.

In one embodiment, only one engagement tooth is provided on each of the tongue and the top jaw.

The provision of only a single closing position allows the operator to know when the clamp has been correctly fitted to the correct band tension; the provision of a single engagement tooth on each of the top jaw and the tongue allows the length of the tongue and jaws to be minimised, and so allows the clamp to be made to clamp small diameter articles.

Although only one engagement tooth is preferably provided on the tongue, the tongue may also include at least one further tooth, which is shallower than, and located in front of, the engagement tooth. Such "pre-engagement" tooth or teeth can be used with the tooth on the jaw to hold the band in a closed loop before the final tightening of the clamp, which may take place with the aid of a tool.

As used herein the terms "in front of" and "behind" refer to the position of the feature concerned in the direction towards the tip of the jaws or the tip of the tongue.

The recess in the lower surface of the tongue to accommodate the lower jaw may occupy approximately one quarter to three quarters the width of the clamp.

In one embodiment, the recess on the lower surface of the tongue has a shape corresponding to the shape of the lower jaw whereby the clamp, when closed, has a substantially smooth internal profile. This provides an advantage over the prior art arrangement of U.S. Pat. No. 3,605,200 in that, in the prior arrangement, the innermost jaw on the clamp fits underneath the tongue and often there was a discontinuity in the inner profile of the clamp. This discontinuity could give rise to a leak path unless the clamp is tightened around a flexible hose to such an extent that the hose is so extensively compressed that any leakage path is eliminated but this means that the hose is compressed more than it need be to keep it on a spigot. The arrangement of the present invention has the advantage that no such leak path is provided by the smooth continuous inner surface of the clamp and so such a high compressive force need not be applied to the hose to provide a leak-proof fixing. In turn, this means that the clamp need not be dimensioned to withstand such high forces, meaning that the thickness of the components of the clamp can be reduced, thereby further reducing the thickness of the head and saving material costs.

In one embodiment of the present invention, the outer jaw forms the outer extremity of the head, i.e. the outermost extension provided by the known clamp is dispensed with.

BRIEF DESCRIPTION OF DRAWINGS

There will now be described, by way of example only, a clamp in accordance with the present invention, by reference to the following drawings in which:

FIG. 3 is a view of the first side of the clamp;
FIG. 4 is an enlarged view of part of the clamp of FIG. 3;
FIG. 5 is a view of the second side of the clamp and;
FIG. 6 is a rear view of the clamp.

DETAILED DESCRIPTION OF BEST MODE FOR PUTTING THE INVENTION INTO OPERATION

Figure 1:
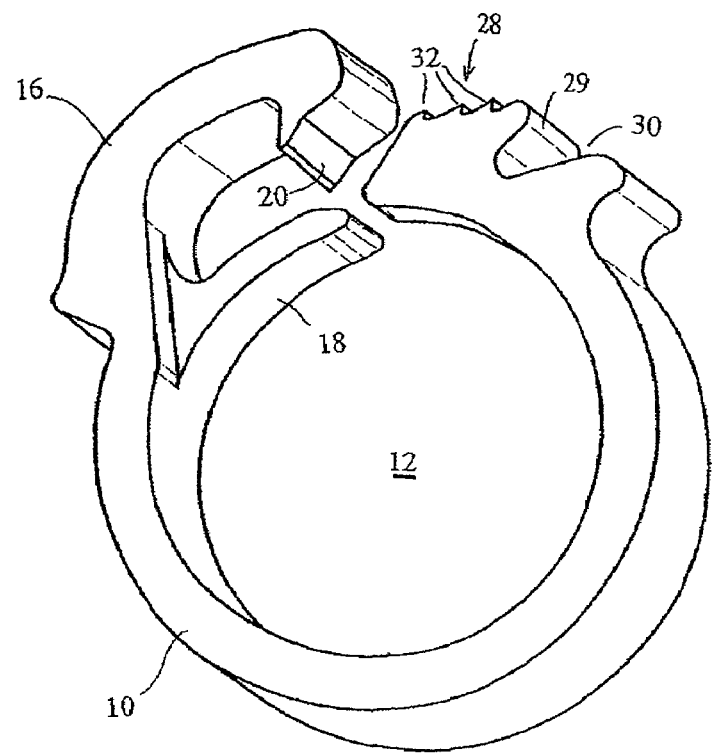
FIG. 1 is a perspective view of the clamp from one side.
Figure 2:
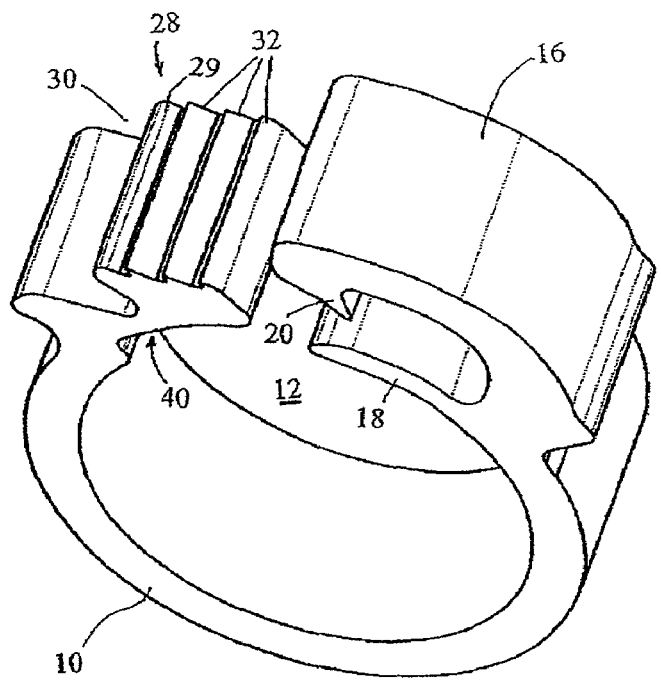
FIG. 2 is a perspective view of the clamp from a second side.

The clamp shown in FIGS. 1 to 6 includes a flexible band that is moulded in a generally circular shape defining a generally circular internal cavity 12. The band can be flexed outwardly to be placed around an object being clamped.

A pair of jaws 14 is provided at one end of the band 10 that includes an upper jaw 16 and a lower jaw 18. A single tooth 20 is provided on the inner (lower) surface of the upper jaw 16 in the space 22 between the pair of jaws. The tooth is barbed, that is to say it has a front surface 24 and a rear surface 26 that each slope backwardly into the space 22 between the jaws (see FIG. 4).

At the other end of the band 10, there is provided a tongue 28 that can be pushed tip first in the direction of arrow A (see FIG. 4) into the space 22 between the jaws 16, 18. The tongue 28 is provided with a tooth 29 having a deep recess 30 behind it. In front of the tooth 29 there are three smaller "pre-engagement" teeth 32 whose function will be described later. The tongue 28 can be pushed in the direction of arrow A to engage the tooth 20 successively on the three teeth 32 and eventually over tooth 29 to lie within the deep recess 30. The back surface 34 of tooth 29 slopes backwardly so as to engage the rear surface 26 of tooth 20. Because of the backward slope on the rear surfaces 26, 34 of the teeth 29, 20, increased tension within the band 10 tends to drive the tooth 20 into the cavity 30.

The force needed to push the tongue 28 into the space 20 may be greater than that achievable by hand and a tool may be required to tighten the clamp. In order to hold the clamp in place while the tool is applied, three pre-engagement teeth 32 are provided that can engage with the jaw tooth 20. This engagement of the jaw tooth 20 by the pre-engagement teeth will generally be achievable by hand. With the band in a stable position on the article being clamped, it is easier to place a tool, for example a pair of pliers, around the head, i.e. between the end surface 36 of the jaws 14 and the end surface 38 of the tongue 28. The tool will squeeze the head and push the tongue further into the space 22 to engage the tooth 20 in the deep cavity 30 behind the tooth 29.

As can most clearly be seen in FIG. 1, the lower jaw 18 only extends across part of the width of the clamp. A recess 40 is provided on the under surface of the tongue that can accommodate the jaw 18. Thus the jaw 18 extends part of the way across the clamp and the recess extends across the remaining part of the clamp. When the lower jaw 18 is located in the recess 40, the lower surface 42 of the lower jaw 18 and the lower surface 46 of the tongue are an approximate continuation of the inner surface 44 of the band adjacent to the tongue 28 and the jaws 14. In this way, the clamp has an inner surface that is smooth and without substantial discontinuities that can provide leak paths when the clamp is used to clamp a hose onto a spigot.

The slope of the front face 24 of the tooth 20 in the portion 31 adjacent to the tooth tip 25 has a slope that is greater than that of the portion 27 further along the tooth away from the tip; this allows the bottom of the tooth to be relatively narrow, allowing it to engage on the pre-teeth 32 while the upper section of the tooth is relatively broad, giving it substantial strength when engaged in the cavity 30 behind tooth 29.

The clamp shown in FIGS. 1 to 6 has a single engagement position, that is to say when the tooth 20 is located behind tooth 29 in the cavity 30 and so is able to engage only a very narrow range of diameters of article, but it is designed for use in circumstances when a known size of clamp is required. This provides the advantage that, so long as the tooth 20 is engaged behind tooth 29, the operator knows that it has been correctly fastened to the required tension. In addition, because the lower jaw 18 engages in the recess 40, the height of the connection joining the band 10 into a closed circle (indicated by the height "h" shown in FIG. 4), is relatively small, namely the thickness of the tongue 28 and the upper jaw 16.

The clamp may be made by injection moulding of a tough plastic material, e.g. nylon-6,6.

Although it is theoretically possible to provide additional teeth on the inside surface of the top jaw 16 behind the tooth 20 that engage with the pre-engagement teeth 32, such teeth will be smaller, i.e. extend into the space 22 to a substantially lesser extent, than the tooth 20 and so have a substantially lesser binding strength than the tooth 20.

The invention claimed is:

1. A clamp for encircling an article and exerting a compression force thereon, the clamp comprising:
a band having a first end and a second end; and
a head for joining the first end of the band to the second end of the band, the head comprising:
a pair of opposed side faces, the head having a width between the pair of side faces;
a pair of axially spaced jaws, said pair of jaws being connected to the first end of the band and comprising:
an upper jaw extending across the width of the head between said side faces and
a lower jaw having a width in the direction between said side faces that is less than the width of the head and,
a tongue that is connected to the second end of the band and that (a) extends across the width of the head between said side faces (b) has a rear end adjoining the band and a front end, (c) can be inserted between the jaws and (d) that has an upper surface and a lower surface, wherein the upper and lower jaws define a mouth at the front of the jaws and are connected together at the rear of the jaws;

wherein the upper jaw has a lower surface that includes one engagement tooth located at the front of the upper jaw and that is taller than any other tooth on said lower surface of the upper jaw;

wherein the upper surface of the tongue includes an engagement tooth having a cavity behind it that can accommodate said engagement tooth of the upper jaw, whereby said engagement teeth can be brought into engagement with each other by inserting the tongue between the jaws to hold the clamp in a closed position;

wherein the cavity behind the engagement tooth on the tongue is deeper than the cavity behind any other tooth on said upper surface of the tongue;

wherein the clamp has only a single closing position with said engagement tooth on the jaw being engaged in the recess behind the engagement tooth on the tongue;

wherein the lower surface of the tongue is provided with a recess that extends only part of the way across the width of the tongue and that accommodates the lower jaw when the clamp is in said closed position; and wherein said engagement teeth each has a base, a tip and a rear surface that is in contact with the rear surface of the other engagement tooth when the clamp is in the closed position and wherein said rear surface of the engagement tooth on the upper jaw slopes towards the rear of the jaws in the direction from the base of the tooth to the tip of the tooth and said rear surface of the engagement tooth on the tongue slopes towards the front end of the tongue in the direction from the tip of the tooth to the base of the tooth.

2. A clamp as claimed in claim 1, wherein only a single engagement tooth is provided on the lower surface of the upper jaw.

3. A clamp as claimed in claim 1, wherein said upper jaw has an upper surface opposed to said lower surface and wherein said upper surface forms the outermost part of the clamp when the clamp is in the closed position.

4. A clamp as claimed in claim 1, wherein the engagement tooth on the top surface of the tongue has a deeper cavity behind it than any other tooth on the top surface of the tongue.

5. A clamp as claimed in claim 1, wherein the tongue has only one engagement tooth on the top surface of the tongue that can engages a tooth on the jaws when the clamp is in the closed position with said engagement tooth on the jaw being engaged in said recess behind the engagement tooth on the tongue.

6. A clamp as claimed in claim 1, which include at least one further tooth located on the top surface of the tongue in front of said engagement tooth and wherein said at least one further tooth can hold the engagement tooth on the top jaw prior to the band being placed in said closed position, wherein at least one further tooth defines a cavity behind it that is shallower than the cavity behind the engagement tooth on the top surface of the tongue.

7. A clamp as claimed in claim 6, wherein the engagement tooth on the top jaw has a front face and a rear face that converge at the tip of the tooth and wherein the slope of the front face adjacent to the tip has a slope that is greater than the slope of the front face further away from the tip.

8. A clamp as claimed in claim 1, wherein the recess in the lower surface of the tongue has a shape corresponding to the lower jaw whereby the clamp, when in the closed position, has a substantially continuous internal profile.

9. A clamp as claimed in claim 1, wherein the recess in the tongue occupies approximately one quarter to three quarters of the width of the head between the side faces.

10. A clamp as claimed in claim 1, wherein the cavity behind the engagement tooth on the tongue can accommodate the whole of said engagement tooth on the jaw and is the only cavity on the upper surface of the tongue that can accommodate the whole of said engagement tooth on the jaw.

11. A clamp for encircling an article and exerting a compression force thereon, the clamp comprising:

a band having a first end and a second end;

a pair of opposed side faces, the clamp having a width between said side faces;

a pair of axially spaced jaws, said pair of jaws being connected to the first end of the band and comprising:
an upper jaw extending across the width of the clamp between said side faces and a lower jaw having a width in the direction between said side faces that is less than the width of the clamp and, a tongue that is connected to the second end of the band and that (a) extends across the width of the clamp between said side faces (b) has a rear end adjoining the band and a front end, (c) can be inserted between the jaws and (d) that has an upper surface and a lower surface, wherein the upper and lower jaws define a mouth at the front of the jaws and are connected together at the rear of the jaws;

wherein the upper jaw has a lower surface that includes one engagement tooth located at the front of the upper jaw and that is taller than any other tooth on said lower surface of the upper jaw;

wherein the upper surface of the tongue includes an engagement tooth having a cavity behind it that can accommodate said engagement tooth of the upper jaw, whereby said engagement teeth can be brought into engagement with each other by inserting the tongue between the jaws to hold the clamp in a closed position;

wherein the cavity behind the engagement tooth on the tongue is deeper than the cavity behind any other tooth on said upper surface of the tongue, wherein the clamp has only a single closing position with said engagement tooth on the jaw being engaged in the recess behind the engagement tooth on the tongue;

wherein the lower surface of the tongue is provided with a recess that has a width in the direction between said side faces that is less than the width of the clamp and that accommodates the lower jaw when the clamp is in said closed position; and wherein said engagement teeth each has a base, a tip and a rear surface that is in contact with the rear surface of the other engagement tooth when the clamp is in the closed position and wherein said rear surface of the engagement tooth on the upper jaw slopes towards the rear of the jaws in the direction from the base of the tooth to the tip of the tooth and said rear surface of the engagement tooth on the tongue slopes towards the front end of the tongue in the direction from the tip of the tooth to the base of the tooth.

* * * * *